United States Patent [19]
Woolsey

[11] Patent Number: 5,488,566
[45] Date of Patent: Jan. 30, 1996

[54] MULTI-COIL IMPEDANCE

[75] Inventor: Kevin G. Woolsey, Snohomish, Wash.

[73] Assignee: Eldec Corporation, Lynnwood, Wash.

[21] Appl. No.: 430,278

[22] Filed: Apr. 28, 1995

Related U.S. Application Data

[63] Continuation of Ser. No. 892,164, Jun. 2, 1992, abandoned.
[51] Int. Cl.⁶ .................................................. G01B 7/14
[52] U.S. Cl. ................ 364/488; 324/207.11; 324/207.15; 364/482
[58] Field of Search .................................. 364/480, 481, 364/482, 483, 488; 324/207.11, 207.15, 207.16, 207.18

[56] References Cited

U.S. PATENT DOCUMENTS

| | | |
|---|---|---|
| 4,282,485 | 8/1981 | Pauwels et al. . |
| 4,623,840 | 11/1986 | Fujimura et al. . |
| 4,926,123 | 5/1990 | Redlich . |
| 5,061,896 | 10/1991 | Schmidt .............................. 324/207.18 |
| 5,107,195 | 4/1992 | Lyons et al. ............................ 318/701 |

*Primary Examiner*—James P. Trammell
*Assistant Examiner*—Edward Pipala
*Attorney, Agent, or Firm*—Christensen, O'Connor, Johnson & Kindness

[57] ABSTRACT

Disclosed is a method of designing a position sensor having a plurality of coils so that the total impedance of the sensor varies according to a desired impedance function. The method includes the steps of modelling the position sensor on a computer using a finite element analysis program to determine the vector potential and current density within the sensor due to a known current flowing in each of the coils. A set of matrix equations is then developed that relates vector potential, the current density and the number of turns, $N_i$, in each coil to a point on the desired impedance function. The set of matrix equations is then optimized to determine the number of turns, $N_i$, that each coil should contain, so that the total impedance of the sensor varies according to the desired impedance function.

7 Claims, 3 Drawing Sheets

MULTI-COIL IMPEDANCE

This application is a continuation application based on prior application Ser. No. 07/892,164, filed Jun. 2, 1992 now abandoned.

FIELD OF THE INVENTION

The present invention relates to position sensors in general and, in particular, to a method of designing impedance position sensors.

BACKGROUND OF THE INVENTION

Due to their rigid construction and high reliability, impedance position sensors are often used to determine the position of an object in harsh environments. This is particularly true in aircraft, where such sensors are used to determine the position of the aircraft's flight surfaces or landing gear, etc. A typical impedance sensor includes a plurality of serially connected coils wound coaxially on a nonmagnetic bobbin. A target element, coupled to the object whose position is to be sensed, moves within the coils and changes the coils' impedance. This change of impedance can be measured to give an indication of the position of the object.

The problem faced by electrical engineers who design impedance position sensors is to determine the number of turns of wire that each of the plurality of coils should contain so that the impedance of the sensor varies according to a desired impedance function as the target is moved within the coil. Most often, it is desirable to have the impedance vary linearly as the position of the target is changed. However, sometimes it is desirable to have a sensor with an impedance that varies in a nonlinear fashion. In the past, engineers would design such sensors by winding an equal number of turns on each coil and plotting the change in impedance versus the target position on a graph. The number of turns in each coil would then be manually adjusted so that the impedance of the sensor varied as closely as possible according to the desired response of the sensor. Because the total impedance of the sensor varies according to the self inductance of each coil and the mutual inductance coupling between the coils, this process of manually adjusting the number of turns in each coil so that the impedance varies according to the desired response becomes nearly impossible as the number of coils increases. Specifically, because changing the number of turns in one coil affects the inductance of each of the other coils, it becomes nearly impossible to find the number of turns each coil should have so that the total impedance of the sensor varies as desired. In prior art inductive position sensors, it was very difficult to develop a sensor design having an inductance that did not vary from the desired inductance function by less than 0.25 percent.

Therefore, to overcome the problems of prior art impedance sensor design, what is needed is a method of designing position sensors that is quick, easy and accurate.

SUMMARY OF THE INVENTION

To solve the problems associated with the prior art trial and error method of designing impedance-type position sensors, the present invention comprises a method for determining the number of turns, $N_i$, that each coil of an impedance sensor should contain so that the impedance of the sensor varies according to a desired impedance function. The method comprises the steps of modelling the position sensor on a digital computer to determine the vector potential, A, and current density, J, within the position sensor due to a known current flowing in each of the coils at a given target position. The vector potential and current density terms are then arranged into an equation that relates the number of turns, $N_i$, in each coil to the total impedance of the sensor for a given target position. A set of equations are then developed by setting the equations equal to a plurality of points on a plot of the desired impedance function of the sensor. The set of equations is then optimized for the number of turns, $N_i$, that each coil should contain so that the impedance of the sensor varies as the desired impedance function. The number of turns in each coil can be optimized so that the resistance, inductance or impedance of the sensor varies according to a desired function depending on the electronics used to measure the output signal of the sensor.

One method of completing the equations used to optimize the number of turns that each coil of the sensor should have is by computing the dot product of a magnetic vector potential, A, induced in the position sensor due to a current flowing in one of the coils and a current density, J, within the sensor due to a current in the coils. The equations may also be completed by applying a known current to each coil of the position sensor and measuring the induced voltage in each of the remaining coils.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
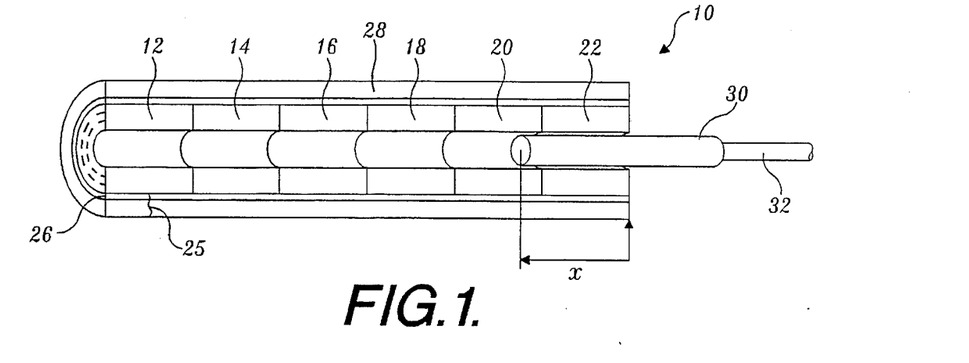
FIG. 1 is an isometric, cross-sectional view of an impedance-type position sensor.

To illustrate how the present invention is used, an isometric, cross-sectional view of a typical inductive position sensor is shown in FIG. 1. The inductive position sensor 10 comprises a plurality of individual coils 12–22 that are connected in series and wound on a nonmagnetic bobbin 25. Surrounding the coils is a metallic housing, which shields the sensor from electromagnetic interference as well as prevents contaminants from entering the sensor. The housing includes an inner layer 26 made of a highly permeable material and an outer layer 28 made of a material having relatively low permeability. A target element 30, which may include a separate rod 32, is coupled to the object whose position is to be sensed. As the object moves, the target element 26 is moved to a position, x, along an axis that extends through the center of the coils 12–22. As the target element 26 is moved, the total impedance of the sensor changes. Measurement of the total impedance thereby provides an indication of the position of the object. The construction of the position sensor 10 and the electronics required to measure the sensor's varying impedance are well known to those of ordinary skill in the art of sensor design and therefore need not be discussed further.

The present invention comprises a method of determining how many windings or turns each of the plurality of coils 12–22 should contain so that the total impedance of the sensor varies according to a desired impedance function. As stated above, this desired output impedance function may or may not be linear. With the present inventive method it is possible to design a sensor that has a resistance, an inductance or an impedance that varies according some desired function. What parameter is varied as the target element is moved within the sensor is a function of the type of electronics used to measure the output of the sensor. For simplicity, the present discussion will begin with designing a position sensor having an inductance that varies according to a desired inductance function.

Figure 2:
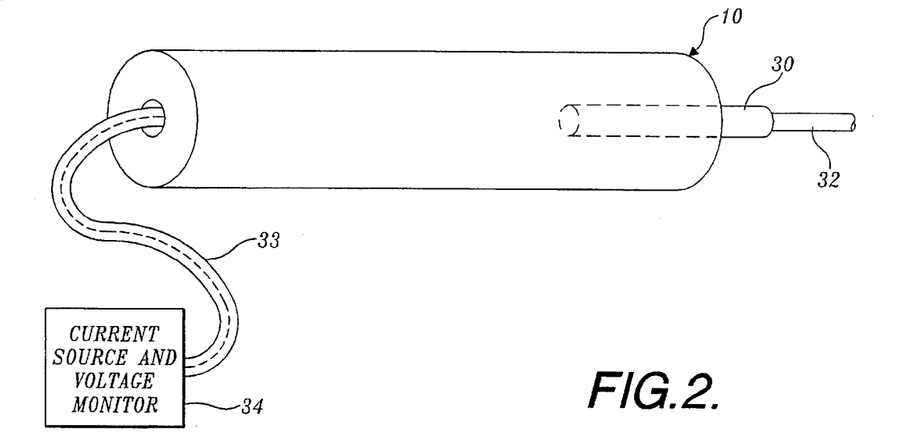
FIG. 2 shows a current source and voltage monitor that can be used to design an impedance position sensor manually according to the method of the present invention.
Figure 7:
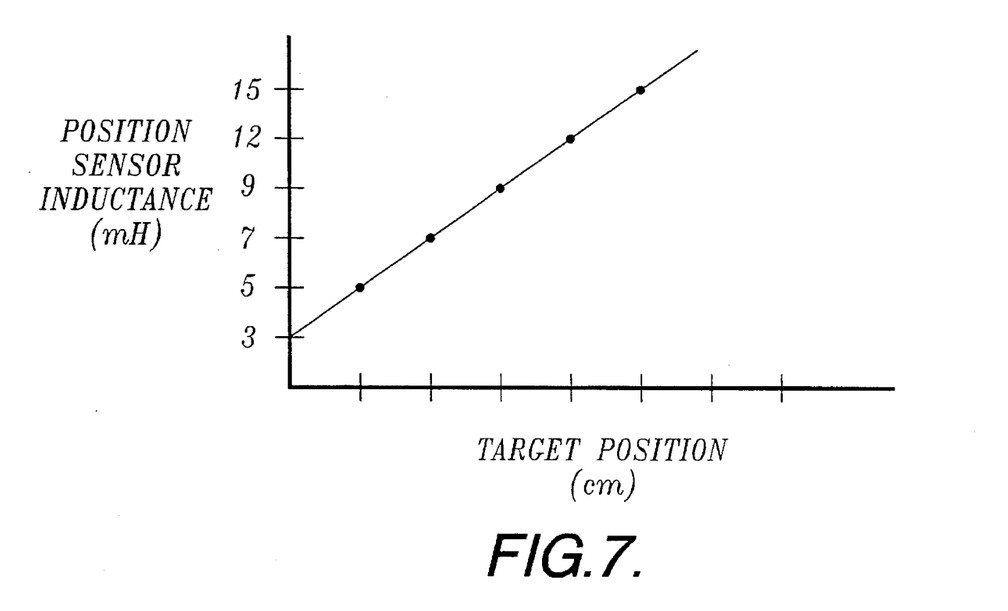
FIG. 7 is a graph of a typical desired inductance function that plots how the inductance of a sensor is to vary versus the position of a target element.

FIG. 7 shows an example of one possible desired inductance function. As the target element is moved a distance of 6 centimeters within the sensor, the total inductance of the sensor varies linearly from 3 milli-Henries to 15 milli-Henries. In order to design a position sensor according to the present invention, the self inductance and mutual inductance of each coil within the position sensor must be known. FIG. 2 shows the equipment needed to manually determine these parameters. To begin, a prototype of the sensor 10 is produced having the dimensions of the desired position sensor. Initially, each coil in the prototype is wound with the same number of turns. The individual wires 33 that comprise the beginning and ending of each coil are not yet connected in series, but are connected to a current source and voltage monitoring circuit 34. The current source is used to supply a known current in each coil, which in turn induces a voltage in each of the coils that is measured by the voltage monitoring circuit at a given target position within the coils. Next, the current source is moved to supply a known current to the next coil in the prototype and the induced voltages within each of the coils are again measured at the same target position.

Figure 3:
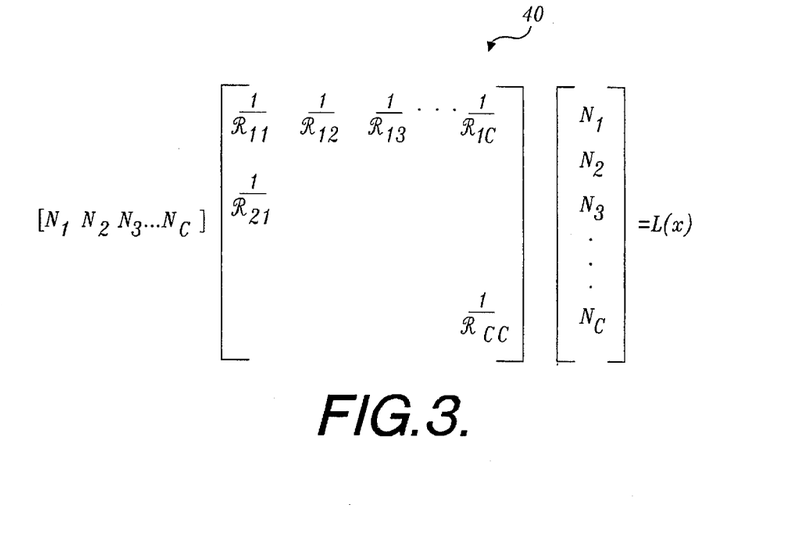
FIG. 3 shows a matrix equation that is used to solve for the optimum number of turns, $N_i$, that each coil of a position sensor should contain so that the inductance of the sensor varies according to a desired inductance function.

After determining the voltage induced in each coil, a matrix equation of the form shown in FIG. 3 is developed. A so-called inverse reluctance matrix 40 comprises a plurality of terms, 1 $\mathcal{R}_{11}$, 1 $\mathcal{R}_{12}$, 1 $\mathcal{R}_{13}$, ... 1 $\mathcal{R}_{CC}$, that are proportional to each coil's self or mutual inductance. Each term 1 $\mathcal{R}_{ij}$ equals:

$$\frac{1}{\mathcal{R}_{ij}} = \frac{v_{ij}}{i\omega N_i N_j} \quad (1)$$

where $v_{ij}$ is the voltage induced in coil j due to a current flowing in the ith coil, $N_i$ and $N_j$ are the number of turns in the ith and jth coils, respectively, i is the magnitude of the current flowing in the coil and $\omega$ is the frequency of the current. Therefore, 1 $\mathcal{R}_{11}$ is proportional to the self inductance of the first coil in the sensor while 1 $\mathcal{R}_{12}$ is proportional to the mutual inductance due to the magnetic coupling between the first and second coils in the sensor. The terms of the inverse reluctance matrix 40 are determined for each combination of coils i and j. However, the matrix 40 is symmetrical about its diagonal axis because the magnetic coupling between coil i and coil j is always equal to the magnetic coupling between coil j and coil i, and therefore not all the terms of the matrix need to be calculated separately.

Once the two-dimensional, inverse reluctance matrix 40 has been completed, the entire matrix equation shown in FIG. 3 is then set equal to one point on the desired inductance function-such as that shown in FIG. 7. The point is chosen to correspond to the position of the target element used to calculate the matrix. This entire process of applying a current to a coil and measuring the induced voltage in the other coils is then repeated for a new target position. Equation 1 is then recalculated and used to complete a new two-dimensional matrix 40 and so on.

Figure 4:
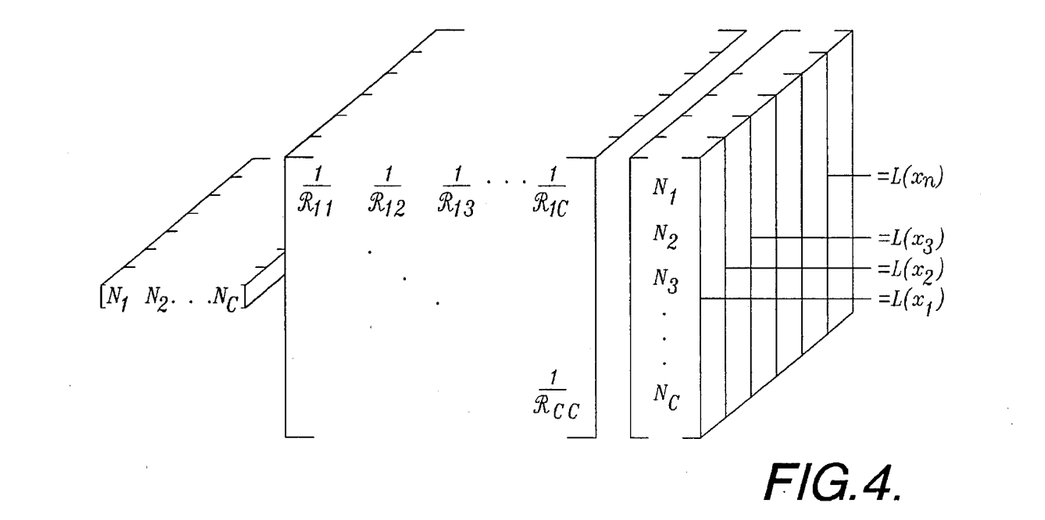
FIG. 4 shows a three-dimensional matrix equation that is optimized to determine the number of turns that each coil should contain so that the position sensor has an inductance that varies according to a desired inductance function.

After completing a series of two-dimensional matrices, a three-dimensional matrix of the form shown in FIG. 4 is assembled. Each two-dimensional matrix within the three-dimensional matrix is equated to one point on the desired inductance function at a given target position, x, as described above.

After the three-dimensional matrix has been completed, the number of turns, $N_i$, that each coil should contain so the total inductance of the sensor varies according to the desired inductance function is determined. The calculation is made by optimizing the three-dimensional matrix according to any well-known matrix optimization technique. For accuracy, it is desirable that the three-dimensional matrix is overdetermined, that is, if there are more equations than there are coils in the sensor. If the matrix is overdetermined, a least-squares optimization method can be used to determine the number of turns, $N_i$. An interesting property of the inverse reluctance matrix 40 is that the terms of the matrix are independent of the current flowing within the coils. As will be further discussed below, the nonvarying property of the terms of the matrix 40 holds true if the sensor 10 is made of linear materials such that the inductance of any of the coils is independent of the current flowing in the coils.

The terms of the inverse reluctance matrix 40 can also be determined using a digital computer and finite element techniques. As is well known to those skilled in the art, the energy stored in each coil of the sensor is equal to:

$$\text{Energy} = \frac{1}{2} L I^2$$

where L is the inductance of the coil and I is the current flowing through the coil. The energy stored in a coil is also equal to:

$$\text{Energy} = 1/2 \int_v A \cdot J dv \quad (3)$$

where A is the magnetic vector potential and J is the current density within the coil. Note that for a time harmonic case J becomes J-conjugate J*. Therefore, by substitution it can be shown that the inductance, L, of the coil is equal to:

$$L = \frac{\int_v A \cdot J dv}{I^2} \quad (4)$$

Assuming that the number of turns, N, multiplied by the current, I, in each coil is a constant (which for simplicity is equal to 1), then it can be said that $$I = \frac{1}{N} \quad (5)$$

If this is true, then it follows that the inductance of each coil is a function of the energy stored in each coil, expressed as:

$$L_{ij} = N_i \int_v A_i \cdot J_j dv N_j \quad (6)$$

where the energy stored in each coil is due to the coils self inductance when i equals j and a coil's mutual inductance when i is not equal to j.

Figure 5:
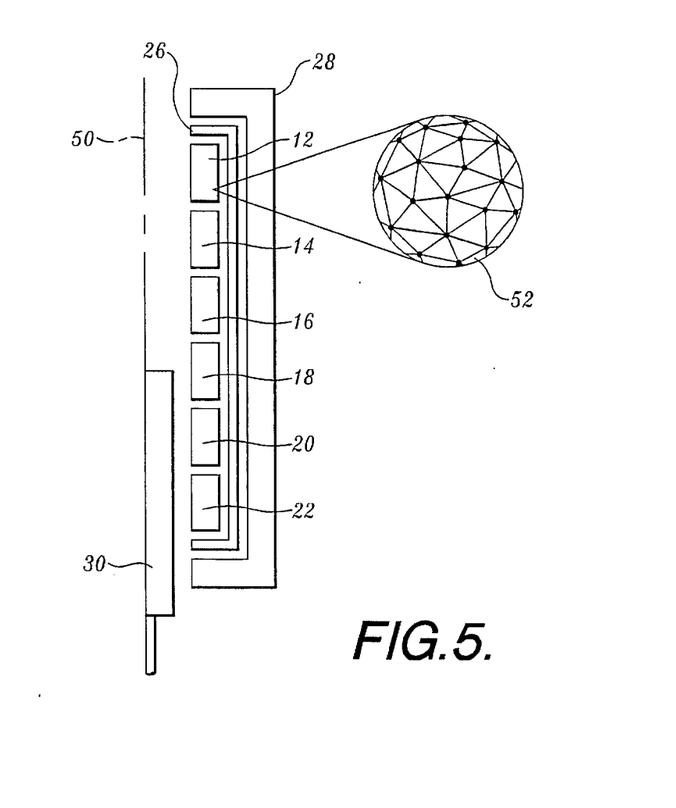
FIG. 5 is a diagram showing how the position sensor is modeled on a computer using a finite element analysis program to determine a vector potential, A, and a current density, J, induced in the sensor due to a current flowing in the coils.

In order to determine the quantities A and J within each of the coils, the inductive position sensor is modeled on a computer using a finite element analysis program. One example of such a program is Maxwell® 2-D Field Simulator by Ansoft Corporation. However, other finite element programs could be used. FIG. 5 shows how the sensor is modeled using the finite element analysis program. Because the position sensor is symmetric about a center axis 50, the sensor can be modeled in two dimensions. The solution obtained from the two-dimensional model of the sensor can then be multiplied by $2\pi r$, where r is the radius of the coils, to determine the total solution of A and J for the sensor.

To model the sensor, me dimensions of the housing 25 including the dimensions of the outer layer 28 and inner layer 26 are entered along with the physical properties of the material being used. Next, the dimensions of the plurality of coils 12–22 that comprise the position sensor are entered into the computer. Preferably, each of the coils 12–22 is initially modeled as one large turn of wire. Next, the dimensions of the target element 30 are entered into the computer.

After entering the dimensions of the position sensor into the computer, the problem is meshed with the aid of the computer and the finite element software into a series of small triangles such as shown in area 52. At each node of a triangle, the finite element analysis program will compute an exact solution for the vector potential, A, induced in the sensor by a current flowing in any of the coils. The solutions for the points between the nodes can be determined by the computer using any of a number of interpolation techniques. How the problem space (i.e., the position sensor) is meshed is a function of the type of problem to be solved; however, in general it is preferable to divide the problem space more closely in areas where the flux density, B, has the largest gradient. In the example shown in FIG. 5, a high-density mesh is required within the high permeability inner layer 26 that lines the inside of the sensor and an outer layer of the target element 30.

Once the problem space has been meshed, the computer determines the vector potential, A, and the current density, J, at each of the nodes due to a known current flowing within the coil. For simplicity it is preferable to assume that one amp/turn of current flows through each of the coils, i.e., assuming one amp flows through a coil containing one turn. However, the problem could be solved with ½ amp flowing in two turns in each coil, one milliamp flowing in a coil with 1,000 turns in each coil, etc., so that the number of turns times the current flowing in the coils is constant. Assuming first that the current flows through coil 12, the vector potential and current density induced within coil 12 and the remainder of the sensor can be computed.

After determining the vector potential and current density at each node, the following equation is calculated for the volume of the sensor:

$$-\frac{\partial \mathcal{R}}{\partial_{ij}} = \int_v A_i \cdot J_j dv \quad (7)$$

where $A_i$ is the vector potential induced in the position sensor due to a current in the ith coil and $J_j$ is the current density within the sensor due to a current in the jth coil. For example, 1 $\mathcal{R}_{12}$ is the integral of $A_1$ (the vector potential induced in the sensor due to a current in coil 1) dotted with $J_2$ (the current density produced in the sensor due to a current flowing in coil 2) over the volume of the problem space.

Figure 6:
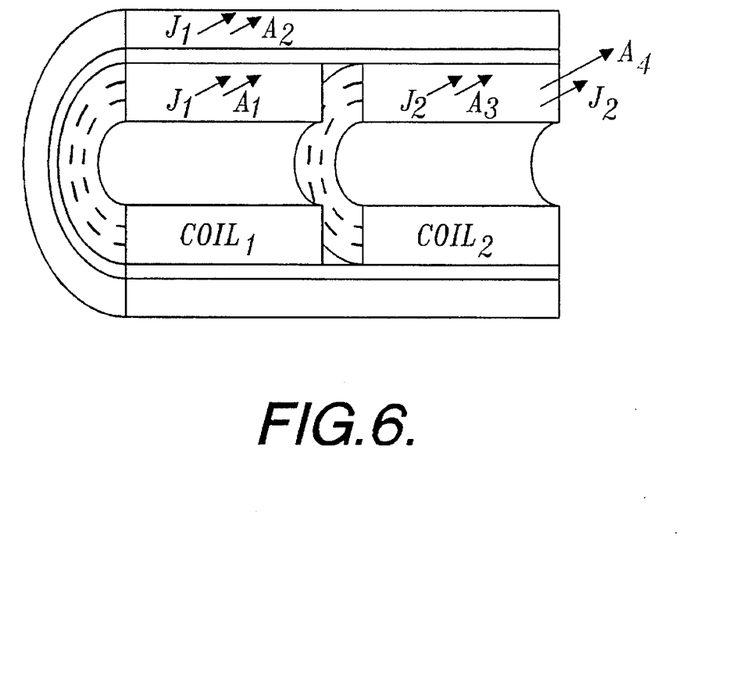
FIG. 6 is a pictorial representation of a magnetic vector potential and current density vector as these vectors exist within the sensor.

For purposes of illustration, FIG. 6 shows how the magnetic vector potentials, A, and the current density, J, lie within two coils, $Coil_1$ and $Coil_2$. For example, in $Coil_1$ two vector potentials, $A_1$ within $Coil_1$, and $A_2$, just outside $Coil_1$, are shown. Vector $A_1$ is calculated by the finite element analysis program due to a current flowing in $Coil_1$, and vector $A_2$ is induced in the sensor due to a current flowing in $Coil_2$. Similarly, $Coil_2$ shows two magnetic vector potentials, $A_3$ and $A_4$. Vector $A_3$ is induced due to a current flowing in $Coil_2$, and vector $A_4$ is induced due to a current in $Coil_1$, etc. The current densities, $J_1$ within $Coil_1$ and $J_2$ within $Coil_2$, are pointed in the same direction as the magnetic vector potentials. Therefore, the dot product of Equation 7 shown above can be computed by a simple multiplication. Additionally, in the preferred embodiment of the present method, the current densities are constant throughout the coils. However, this need not necessarily be true.

After computing Equation 7 for all the combinations of i and j, the results are arranged into a two-dimensional inverse reluctance matrix 40 shown in FIG. 3. After the matrix 40 has been completed, a new model of the sensor is set up to be solved by the finite element analysis program in exactly the same manner except that the position of the target 30 is moved. After the new model is solved, a new two-dimensional matrix 40 is completed. This process is repeated for a plurality of target positions. As will be further described below, it is desirable to develop at least two times as many matrices as there are number of coils in the sensor being designed.

After developing the sets of matrices 40 using the finite element analysis and Equation 7 described above, a three-dimensional matrix is set up as is shown in FIG. 4. Again each two-dimensional matrix 40 that comprises the three-dimensional matrix 70 is set equal to a single point on the desired inductance function for a given target position corresponding to the target position used to compute the matrix 40. Using the desired inductance function shown in FIG. 7, L(1 cm)=5 milli-Henries, L(2 cm)=7 milli-Henries, etc. As stated above, the desired inductance function need not be linear and could comprise an exponential or other nonlinear function.

After the three-dimensional matrix has been constructed, the three-dimensional matrix shown in FIG. 4 must be optimized for the values, $N_i$, that allow the total inductance of the sensor to vary according to the desired output function as described above. Any solutions of the optimization that are negative indicate that the coil is to be wound in the reverse direction compared to coils having a positive value.

Because the physical area occupied by the number of turns, N, obtained from the optimization procedure may differ from the area used in modelling the position sensor on the computer, the position sensor should be modelled again assuming the new area for each coil. Usually one extra iteration of the method is sufficient to converge on a solution for the correct number of turns, N, each coil should contain so that the inductance of the sensor varies according to the desired inductance function.

The terms of the two-dimensional matrix 40 shown in FIG. 3 remain constant despite changes in current. As stated above, this is true providing the sensor is made from linear materials. One example of such a material is nickel-iron-molybdenum alloy of the type identified by the mark HI-MU "80"® manufactured by the Carpenter Steel Division of Carpenter Technology Corporation. Therefore, the terms of the inverse reluctance matrix 40 shown in FIG. 3 do not change despite changes in current and the optimization method is able to solve for the number of turns, $N_i$, each coil should contain so that the total inductance of the sensor is equal to the desired inductance function shown in FIG. 7 at any given target position. The solutions obtained from the optimization method typically have less than 0.001% error. This is a great improvement over the previous method of designing such sensors by hand.

As mentioned above, the method according to the present invention can also be used to design a sensor so that the resistance or impedance of the sensor varies according to some desired function. In the resistance case, the inverse reluctance matrix 40, shown in FIG. 3, becomes an inverse conductance matrix with each term $1/\mathcal{R}_{ij}$ being replaced with $1/G_{ij}$, where $1/G_{ij}$ has the form:

$$\frac{1}{G_{ij}} = \int_v \frac{J_i \cdot J_j}{s} \, dv \tag{8}$$

where J is the current density in the position sensor due to a current flowing within coil j, and $\sigma$ is the conductivity of the coils. Equation 8 is calculated for each combination of coils at a given target position using the finite element analysis program as described above. After calculating all the combinations of Equation 8, a two-dimensional inverse conductance matrix 40 is completed. A DC resistance term, $R_{DC}$, for each coil should be added so that the total resistance of the sensor at a given target position becomes:

$$R_{total} = \sum_{i=1}^{C} R_{DC_i} + \sum_{i=1}^{C} \sum_{j=1}^{C} N_i \int_v \frac{J_i \cdot J_j}{\sigma} \, N_j \tag{9}$$

After Equation 9 has been set up, the target is moved and the process of calculating the current density, J, is repeated. Once a sufficient number of matrices 40 have been completed, a three-dimensional matrix similar to that shown in FIG. 4 is formed. Each two-dimensional matrix within the three-dimensional matrix is then set equal to a corresponding point on a desired resistance function that relates the total resistance of the sensor versus target position. The resulting three-dimensional matrix equation is then optimized to determine the number of turns, N, each coil should contain so that the resistance of the sensor varies according to the desired resistance function as described above.

In order to optimize the impedance of the coils, the $1/\mathcal{R}_{ij}$ terms of the matrix 40 shown in FIG. 3 are replaced with a complex number, having the form:

$$\frac{1}{G_{ij}} + j\omega \frac{1}{\mathcal{R}_{ij}} = \int_v \frac{J_i \cdot J_j}{\sigma} \, dv + j\omega \int_v A_i \cdot J_j dv \tag{10}$$

Again, the finite element analysis program is used to compute Equation 10 for each combination of coils i and j in order to complete a two-dimensional matrix 40. The DC resistance of the coils, $R_{DC}$, must be added to the two-dimensional complex matrices so that the entire impedance of the sensor can be described by the equation $$Z_{total} = \sum_{i=1}^{C} R_{DC_i} + \sum_{i=1}^{C} \sum_{j=1}^{C} N_i \int_v \frac{J_i \cdot J_j}{\sigma} \, dv N_j + \tag{11}$$

$$j\omega \sum_{i=1}^{C} \sum_{j=1}^{C} N_i \int_v A_i \cdot J_j dv N_j$$

The resulting two-dimensional matrices are arranged into a corresponding three-dimensional matrix by equating each two-dimensional matrix to a corresponding point on a desired impedance function similar to that shown in FIG. 7 except that the impedance of the sensor varies with target position instead of the inductance. The three-dimensional complex matrix is then optimized to determine the number of turns, N, each coil should contain so that the impedance of the coil varies according to the desired function as described above.

The choice of whether one wants to design a sensor that has an inductance, resistance or impedance that varies according to a desired function is determined by the type of electronics that will be used to measure the output of the sensor. Electronics are well known that can be used to measure any of these parameters.

Although the present invention has been described with respect to its preferred embodiment, those skilled in the art will realize that changes could be made without departing from the spirit and scope of the invention. Therefore, it is intended that the scope of the invention be determined solely from the following claims.

The embodiments of the invention in which an exclusive property or privilege is claimed are defined as follows:

1. An inductive position sensor for detecting the position of an object, comprising:

a bobbin;

a movable target element coupled to the object, the target being mounted for movement along a longitudinal axis of the bobbin;

a plurality of serially connected coils, C, wound on the bobbin, each of said coils having $N_i$ turns selected such that the plurality of coils have a total inductance that varies according to a desired inductance function, L(x), as the position of the target element is varied along the longitudinal axis of the bobbin, x being the position of the target element along said axis, wherein the number of turns, $N_i$, in each coil being equal to the number defined by the process which comprises:

determining a vector potential, A, and a current density, J, within the sensor due to a known current passing through the coils of the position sensor;

completing a set of equations having the form:

$$L(x) = \sum_{i=1}^{C} \sum_{j=1}^{C} N_i \left[ -\frac{1}{\mathcal{R}_{ij}} \right] N_j$$

wherein each equation relates a point on the desired inductance function to the number of turns, $N_i$, in each coil and the energy stored in the position sensor at a target element position x; and optimizing the set of equations to determine the number of turns, $N_i$, that each coil should contain such that the total inductance of the position sensor varies according to the desired inductance function.

2. The inductive position sensor of claim 1, where the term $1/\mathcal{R}_{ij}$ is determined by the formula:

$$\frac{1}{\mathcal{R}_{ij}} = \int_v A_i \cdot J_j dv$$

where $A_i$ is the vector potential in the position sensor due to a current flowing in $i^{th}$ coil and $J_j$ is the current density the position sensor due to a current flowing within the $j^{th}$ coil.

3. The inductive position sensor of claim 2, wherein the step of determining the vector potential, A, and the current density, J, is performed on a computer using a finite element analysis program.

4. An inductive position sensor for detecting the position of an object, comprising:

a bobbin;

a movable target element coupled to the object, the target being mounted for movement along a longitudinal axis of the bobbin;

a plurality of serially connected coils, C, wound on the bobbin, each coil having $N_i$ turns, such that the plurality of coils have a total inductance that varies according to a desired inductance function, L(x), as the position of the target element is varied along the longitudinal axis of the bobbin, x being the position of the target element along said axis, wherein the number of turns, $N_i$, in each coil being equal to the number defined by the process which comprises:

applying a known current to each coil of the plurality of coils sequentially;

measuring an induced voltage in the coil in which the current is applied;

measuring an induced voltage in each of the remaining coils in the sensor;

completing a set of equations having the form:

$$L(x) = \sum_{i=1}^{C} \sum_{j=1}^{C} N_i \left[ -\frac{1}{\mathcal{R}_{ij}} \right] N_j$$

wherein each equation relates a point on the desired inductance function to the number of turns, $N_i$, in each coil and the energy stored in the position sensor at a target element position x; and optimizing the set of equations to determine the number of turns, $N_i$, that each coil should contain such that the total inductance of the position sensor varies according to the desired inductance function.

5. The inductive position sensor of claim 4, wherein the term $1/\mathcal{R}_{ij}$ is determined by the formula:

$$\frac{1}{\mathcal{R}_{ij}} = \frac{v_{ij}}{N_i N_j i \omega}$$

where $v_{ij}$ is the voltage induced in the $j^{th}$ coil due to a current flowing in the $i^{th}$ coil, $N_i$ and $N_j$ are the number of turns in the $i^{th}$ and $j^{th}$ coils, respectively, i is the magnitude of the current flowing in the $i^{th}$ coil and $\omega$ is the frequency of the known current applied.

6. A position sensor for detecting the position of an object, comprising:

a non-magnetic bobbin;

a movable target element coupled to the object, the target being mounted for movement along a longitudinal axis of the bobbin;

a plurality of serially connected coils, C, wound on the non-magnetic bobbin each of which has $N_i$ turns, such that the plurality of coils have a total resistance that varies according to a desired resistance function R(x), as the position of a target element is varied along the longitudinal axis of the bobbin, x being the position of the target element along said axis, wherein the number of turns, $N_i$, in each coil being defined by the process which comprises:

determining a vector potential, A, and a current density, J, within the sensor due to a known current passing through the coils of the position sensor;

completing a set of equations having the form:

$$R(x) = \sum_{i=1}^{C} R_{DC_i} + \sum_{i=1}^{C} \sum_{j=1}^{C} N_i \int_v \frac{J_i \cdot J_j}{\sigma} dv N_j$$

wherein each equation relates a point on the desired resistance function to a DC resistance of each coil, the conductance of each coil and the number of turns, $N_i$, in each coil, $J_i$ is the current density in the position sensor due to a current flowing in coil i; and optimizing the set of equations to determine the number of turns, $N_i$, that each coil should contain such that the total resistance of the position sensor varies according to the desired resistance function.

7. A position sensor for detecting the position of an object, comprising:

a non-magnetic bobbin;

a target element coupled to the object, the target being adapted to move along a longitudinal axis of the bobbin;

a plurality of serially connected coils, C, wound on the non-magnetic bobbin the coils having $N_i$ turns, such that the position sensor has a total impedance that varies according to a desired impedance function, Z(x), as the position of the target element is varied along the longitudinal axis of the bobbin, x being the position of the target element along said axis, wherein the number of turns, $N_i$, each coil contains being equal to the number defined by the process which comprises:

determining a vector potential, A, and a current density, J, within the sensor due to a known current passing through the coils of the position sensor;

completing a set of equations having the form:

$$Z(x) = \sum_{i=1}^{C} R_{DC_i} + \sum_{i=1}^{C} \sum_{j=1}^{C} N_i \frac{J_i \cdot J_j}{\sigma} dv N_j +$$

$$j\omega \sum_{i=1}^{C} \sum_{j=1}^{C} N_i \int_v A_i \cdot J_j dv N_j$$

wherein each equation relates a point on the desired impedance function to a DC resistance of each coil, the conductance of each coil and the energy stored in the position sensor; and optimizing the set of equations to determine the number of turns, $N_i$, that each coil should contain such that the total impedance of the position sensor varies according to the desired impedance function.

* * * * *

UNITED STATES PATENT AND TRADEMARK OFFICE
CERTIFICATE OF CORRECTION

PATENT NO. : 5,488,566
DATED : January 30, 1996
INVENTOR(S) : K.G. Woolsey

Page 1 of 5

It is certified that error appears in the above-indentified patent and that said Letters Patent is hereby corrected as shown below:

| COLUMN | LINE | |
|---|---|---|
| 1 | [54] Title | "MULTI-COIL IMPEDANCE" should read --MULTI-COIL IMPEDANCE SENSOR-- |
| 3 | 60 (Formula (1)) | "$\dfrac{1}{ij} = \dfrac{V_{ij}}{i\omega N_i N_j}$" should read --$\dfrac{1}{R_{ij}} = \dfrac{V_{ij}}{i\omega N_i N_j}$-- |
| 4 | 55 (Formula (3)) | "Energy $= \dfrac{1}{2} \int_v A \bullet J dv$" should read --Energy $= \dfrac{1}{2} \int_v A \bullet J dv$-- |
| 3 | 64 (Formula (4)) | "$L = \dfrac{\int_v A \bullet J dv}{I^2}$" should read --$L = \dfrac{\int_v A \bullet J dv}{I^2}$-- |

UNITED STATES PATENT AND TRADEMARK OFFICE
CERTIFICATE OF CORRECTION

PATENT NO. : 5,488,566
DATED : January 30, 1996
INVENTOR(S) : K.G. Woolsey

It is certified that error appears in the above-indentified patent and that said Letters Patent is hereby corrected as shown below:

| COLUMN | LINE | |
|---|---|---|
| 5 | 4 (Formula (6)) | "$L_{ij} = N_i \int_v A_i \bullet J_j \, dv \, N_j$" should read --$L_{ij} = N_i \int_v A_i \bullet J_j \, dv \, N_j$-- |
| 5 | 25 | "me" should read --the-- |
| 6 | 1 (Formula (7)) | "$\frac{1}{R_{ij}} = \int_v A_i \bullet J_j \, dv$" should read --$\frac{1}{R_{ij}} = \int_v A_i \bullet J_j \, dv$-- |
| 7 | 30 (Formula (8)) | "$\frac{1}{G_{ij}} = \int_v \frac{J_i \bullet J_j}{s} dv$" should read --$\frac{1}{G_{ij}} = \int_v \frac{J_i \bullet J_j}{s} dv$-- |

UNITED STATES PATENT AND TRADEMARK OFFICE
CERTIFICATE OF CORRECTION

PATENT NO. : 5,488,566
DATED : January 30, 1996
INVENTOR(S) : K.G. Woolsey

It is certified that error appears in the above-indentified patent and that said Letters Patent is hereby corrected as shown below:

COLUMN  LINE –

7, 30 (Formula (10))

$$"\frac{1}{G_{ij}} + j\omega \frac{1}{\mathcal{R}_{ij}} = \int_v \frac{J_i \bullet J_j}{\sigma} dv + j\omega \int_v A_i \bullet J_j dv"$$

should read $$--\frac{1}{G_{ij}} + j\omega \frac{1}{\mathcal{R}_{ij}} = \int_v \frac{J_i \bullet J_j}{\sigma} dv + j\omega \int_v A_i \bullet J_j dv--$$

8, 55 (Claim 1, line 20)

$$"L(x) = \sum_{i=1}^{c} \sum_{j=1}^{c} N_i \left[\frac{1}{\mathcal{R}_{ij}}\right] N_j"$$ should read $$--L(x) = \sum_{i=1}^{c} \sum_{j=1}^{c} N_i \left[\frac{1}{\mathcal{R}_{ij}}\right] N_j--$$

8, 65 (Claim 2, line 2)   "1 $\mathcal{R}_{ij}$" should read --1/$\mathcal{R}_{ij}$--

UNITED STATES PATENT AND TRADEMARK OFFICE
CERTIFICATE OF CORRECTION

PATENT NO. : 5,488,566
DATED : January 30, 1996
INVENTOR(S) : K.G. Woolsey

It is certified that error appears in the above-indentified patent and that said Letters Patent is hereby corrected as shown below:

COLUMN   LINE —

9           1
(Claim 2, line 3)

"$\dfrac{1}{ij} = \int_v A_i \bullet J_j\, dv$" should read $-- \dfrac{1}{\mathcal{R}_{ij}} = \int_v A_i \bullet J_j\, dv --$ 9           35
(Claim 4, line 23)

"$L(x) = \sum_{i=1}^{c} \sum_{j=1}^{c} N_i \left[ \dfrac{1}{\mathcal{R}_{ij}} \right] N_j$" should read $-- L(x) = \sum_{i=1}^{c} \sum_{j=1}^{c} N_i \left[ \dfrac{1}{\mathcal{R}_{ij}} \right] N_j --$ 9           49
(Claim 5, line 2)

"$1\, \mathcal{R}_{ij}$" should read $-- 1/\mathcal{R}_{ij} --$

UNITED STATES PATENT AND TRADEMARK OFFICE
CERTIFICATE OF CORRECTION

PATENT NO. : 5,488,566
DATED : January 30, 1996
INVENTOR(S) : K.G. Woolsey

It is certified that error appears in the above-indentified patent and that said Letters Patent is hereby corrected as shown below:

| COLUMN | LINE |
|---|---|
| 9 (Claim 5, line 3) | 50 |

"$\frac{1}{R_{ij}} = \frac{V_{ij}}{N_i N_j i \omega}$" should read -- $\frac{1}{R_{ij}} = \frac{V_{ij}}{N_i N_j i \omega}$ --

| 10 (Claim 7, line 20) | 50 |

"$$Z(x) = \sum_{i=1}^{c} R_{DC_i} + \sum_{i=1}^{c}\sum_{j=1}^{c} N_i \frac{J_i \bullet J_j}{\sigma} dv N_j + j\omega \sum_{i=1}^{c}{}_j$$

" should read $$Z(x) = \sum_{i=i}^{c} R_{DC_i} + \sum_{i=1}^{c}\sum_{j=1}^{c} N_i \int_v \frac{J_i \bullet J_j}{\sigma} dv N_j + j\omega \sum_{i=1}^{c}{}_{j=}^{c}$$

--

Signed and Sealed this

Thirtieth Day of July, 1996

Attest:

BRUCE LEHMAN

*Attesting Officer*     *Commissioner of Patents and Trademarks*